(12) United States Patent
Hsieh et al.

(10) Patent No.: US 8,599,156 B2
(45) Date of Patent: Dec. 3, 2013

(54) ELECTRONIC APPARATUS AND METHOD FOR PROCESSING INPUT SIGNAL

(75) Inventors: Fu-Yia Hsieh, Taipei Hsien (TW);
Meng-Fu Hsieh, Taipei Hsien (TW);
Hsi-Chia Huang, Taipei Hsien (TW);
Hsin-Yuan Peng, Taipei Hsien (TW);
Chun-Hua Lee, Taipei Hsien (TW)

(73) Assignee: Acer Incorporated, New Taipei (TW)

( * ) Notice: Subject to any disclaimer, the term of this patent is extended or adjusted under 35 U.S.C. 154(b) by 358 days.

(21) Appl. No.: 13/038,397

(22) Filed: Mar. 2, 2011

(65) Prior Publication Data
US 2012/0113022 A1 May 10, 2012

(30) Foreign Application Priority Data
Nov. 5, 2010 (TW) ................................ 99138177 A

(51) Int. Cl.
*G06F 3/041* (2006.01)

(52) U.S. Cl.
USPC .................... 345/173; 178/18.03; 345/156

(58) Field of Classification Search
USPC ................ 345/156–184; 178/18.03–18.09
See application file for complete search history.

(56) References Cited

U.S. PATENT DOCUMENTS

| | | | |
|---|---|---|---|
| 5,940,065 A * | 8/1999 | Babb et al. ............... | 345/178 |
| 6,061,051 A * | 5/2000 | Chan et al. ............... | 345/173 |
| 6,380,929 B1 * | 4/2002 | Platt ........................ | 345/173 |
| 7,180,508 B2 | 2/2007 | Kent et al. | |
| 7,719,522 B2 | 5/2010 | Lyon et al. | |
| 7,802,265 B2 | 9/2010 | Fairs et al. | |
| 8,284,166 B2 * | 10/2012 | Taylor et al. ............ | 345/173 |
| 2004/0061687 A1 * | 4/2004 | Kent et al. .............. | 345/173 |
| 2006/0066571 A1 * | 3/2006 | Fairs et al. .............. | 345/157 |
| 2006/0066582 A1 * | 3/2006 | Lyon et al. .............. | 345/173 |
| 2006/0066588 A1 * | 3/2006 | Lyon et al. .............. | 345/173 |
| 2007/0242053 A1 * | 10/2007 | Muranaka ............... | 345/173 |
| 2010/0188363 A1 * | 7/2010 | Ikeda et al. ............. | 345/174 |
| 2011/0090257 A1 * | 4/2011 | Ko et al. ................. | 345/660 |

FOREIGN PATENT DOCUMENTS

TW      I313422     8/2009

OTHER PUBLICATIONS

"Office Action of Taiwan Counterpart Application", issued on Jun. 20, 2013, p. 1-p. 7, in which the listed references were cited.

* cited by examiner

*Primary Examiner* — Dmitry Bolotin
(74) *Attorney, Agent, or Firm* — Jianq Chyun IP Office

(57) ABSTRACT

An electronic apparatus and a method for processing an input signal are provided. In the present invention, a signal conversion module is provided, and the signal conversion module registers into an operating system. A raw data corresponding to an input signal is obtained from the operating system through the signal conversion module, when the input signal is received from a human interface device. And a reference value is obtained from a driver of the human interface device through the signal conversion module. The raw data is converted into a coordinate data according to the reference value through the signal conversion module, and the coordinate data is sent to an application program through the signal conversion module.

8 Claims, 2 Drawing Sheets

ELECTRONIC APPARATUS AND METHOD FOR PROCESSING INPUT SIGNAL

CROSS-REFERENCE TO RELATED APPLICATION

This application claims the priority benefit of Taiwan application serial no. 99138177, filed on Nov. 5, 2010. The entirety of the above-mentioned patent application is hereby incorporated by reference herein and made a part of this specification.

BACKGROUND OF THE INVENTION

1. Field of the Invention

The present invention generally relates to a signal processing method, in particular, to a method and an electronic apparatus for processing an input signal of a human interface device.

2. Description of Related Art

With the development of technologies, people increasingly rely on electronic apparatuses. Currently, many commercially available electronic apparatuses are operated using touch panels or touch pads. As currently operating systems can also be used in combination with touch panels, the touch panels will become a development trend in the future.

Since increasingly more touch panels become commercially available, and software conforming to touch operation interfaces is also increasing rapidly, control signals sent from a touch panel are considered as signals from a mouse by the operating system. This is because that touch signals are converted into corresponding mouse signals when the touch panel is touched.

However, as ordinary touch input signals are obtained after processing by an operating system, missing or delay easily occurs to such signals, resulting in a pause in the presentation on an operation interface. Therefore, the interface manipulation will be less smooth when the touch panel is used.

SUMMARY OF THE INVENTION

Accordingly, the present invention is directed to an electronic apparatus and a method for processing an input signal, which can alleviate missing or delay of input signals.

The present invention provides a method for processing an input signal, applicable to an input signal received from a human interface device. Firstly, a signal conversion module is provided, and the signal conversion module registers into an operating system. A raw data corresponding to an input signal is obtained from the operating system through the signal conversion module, when the input signal is received from the human interface device. And a reference value is obtained from a driver of the human interface device through the signal conversion module. The raw data is converted into a coordinate data according to the reference value through the signal conversion module, and the coordinate data is sent to an application program through the signal conversion module.

In an embodiment of the present invention, in the step of obtaining the reference value from the driver of the human interface device through the signal conversion module, the driver obtains a boundary data of the human interface device, and obtains a resolution from the operating system, so as to calculate the reference value according to the boundary data and the resolution. Thus, the raw data can be converted into coordinate data corresponding to the screen resolution according to the reference value.

In an embodiment of the present invention, before the step of converting the raw data into the coordinate data according to the reference value through the signal conversion module, the application program registers into the signal conversion module, when the application program receives a press signal.

In an embodiment of the present invention, the human interface device is a touch device.

The present invention provides an electronic apparatus, including a human interface device and a processor. The processor is coupled to the human interface device. The human interface device is used for generating an input signal. The processor is used for executing an operating system, and executing a signal conversion module under the operating system. The signal conversion module registers into the operating system, the signal conversion module obtains a raw data corresponding to the input signal from the operating system when the input signal is received from the human interface device, and obtains a reference value from a driver of the human interface device, so as to convert the raw data into a coordinate data according to the reference value, and the coordinate data is sent to an application program through the signal conversion module.

In an embodiment of the present invention, the electronic apparatus further includes a controller, respectively coupled to the human interface device and the processor, for converting the input signal from an analog signal into a digital signal.

Based on the above, the present invention provides a signal conversion module to directly process the input signal of the human interface device, so as to effectively alleviate missing or delay of input signals.

In order to make the aforementioned features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
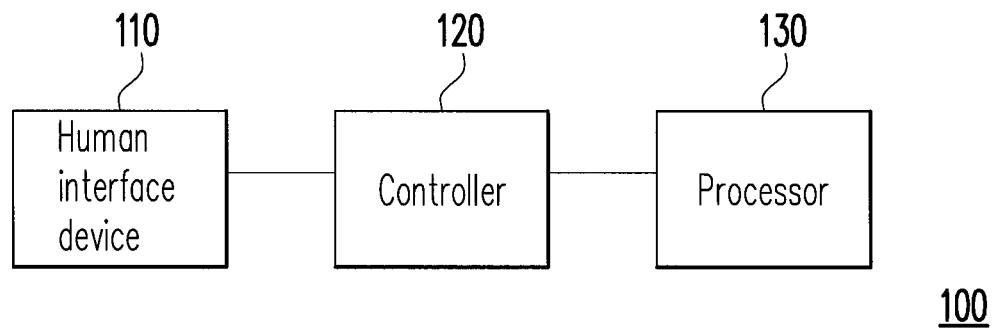
FIG. 1 is a block diagram of an electronic apparatus according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

As ordinary touch input signals are obtained after processing by an operating system, missing or delay easily occurs to such signals, resulting in a pause in the presentation on an operation interface. Therefore, the present invention provides a method for processing an input signal, which can alleviate missing or delay of input signals. In order to make the content of the present invention clearer, embodiments are described below as examples according to which the present invention can be surely implemented.

FIG. 1 is a block diagram of an electronic apparatus according to an embodiment of the present invention. Referring to FIG. 1, the electronic apparatus 100 includes a human interface device 110, a controller 120 and a processor 130. The controller 120 is respectively coupled to the human interface device 110 and the processor 130.

In this embodiment, the human interface device 110 is, for example, a touch panel, for generating an input signal. The controller 120 is used for converting the input signal from an analog signal into a digital signal, and sending the input signal to the processor 130. The processor 130 is used for executing an operating system, and executing a signal conversion module under the operating system, so as to process the input signal through the signal conversion module. This is because that after input signals of a conventional touch panel are processed by the operating system, the number of signals is only half the number of input signals generated by a mouse. In order to alleviate missing or delay of input signals, a signal conversion module is additionally provided to process the input signal generated by the human interface device 110. An embodiment is given below to describe a software architecture installed on the electronic apparatus 100.

Figure 2:
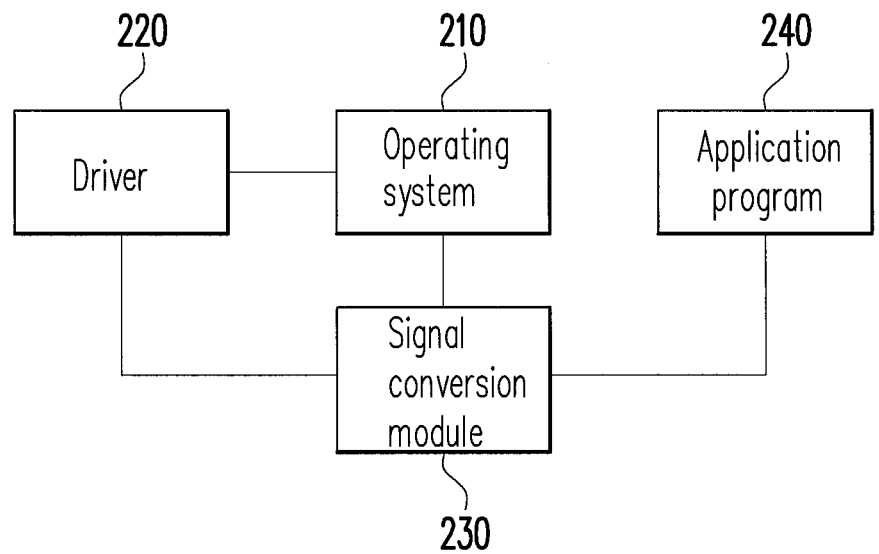
FIG. 2 is a software architectural view of an electronic apparatus according to an embodiment of the present invention.

FIG. 2 is a software architectural view of an electronic apparatus according to an embodiment of the present invention. Referring to FIG. 2, an operating system 210, and a driver 220, a signal conversion module 230 and an application program 240 of a human interface device 110 are installed in the electronic apparatus 100.

The signal conversion module 230 registers into the operating system 210, so as to obtain a raw data of an input signal generated by the human interface device 110. The signal conversion module 230 obtains the raw data corresponding to the input signal from the operating system 210 when the electronic apparatus 100 receives the input signal from the human interface device 110, and obtains a reference value from the driver 220 of the human interface device 110, so as to convert the raw data into a coordinate data according to the reference value, and the coordinate data is sent to the application program 240 through the signal conversion module 230.

Figure 3:
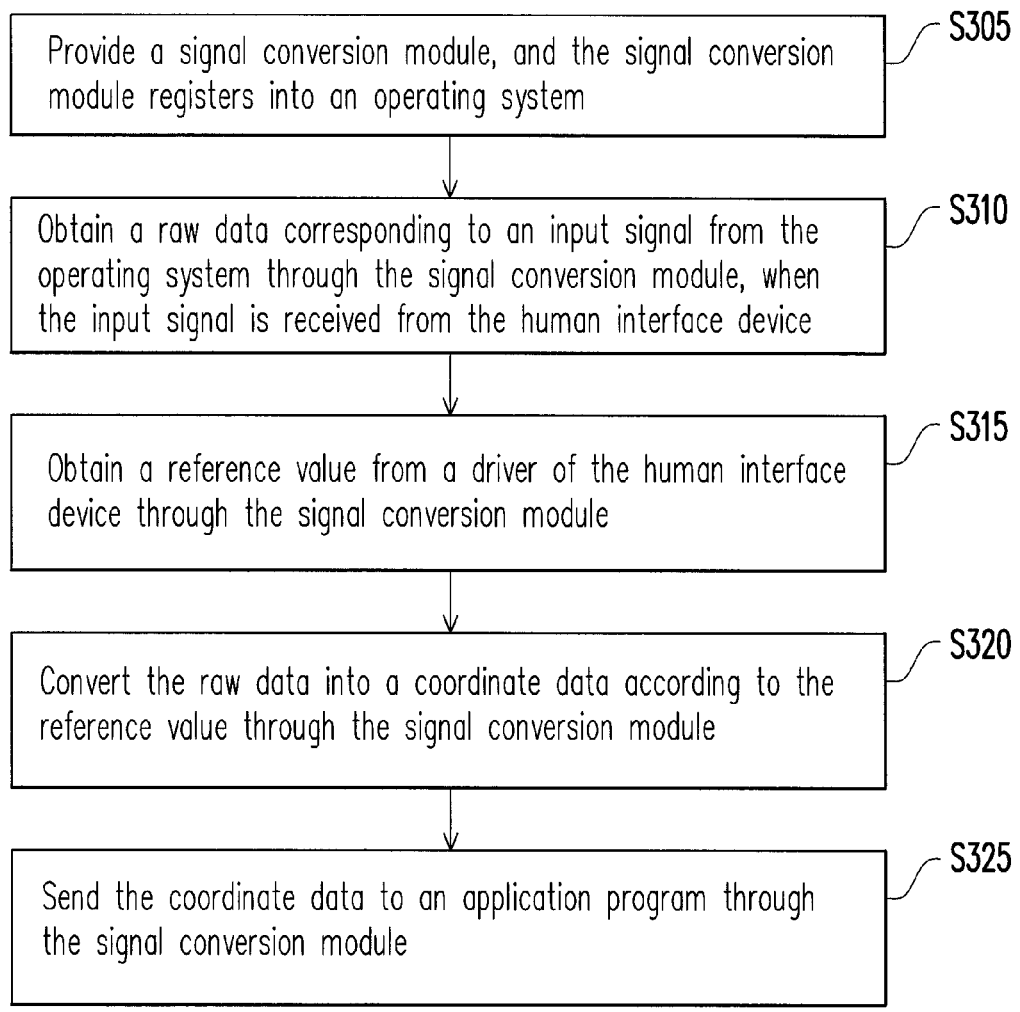
FIG. 3 is a flow chart of a method for processing an input signal according to an embodiment of the present invention.

Steps of the method for processing an input signal is described in detail below with reference to the electronic apparatus 100 described above. FIG. 3 is a flow chart of a method for processing an input signal according to an embodiment of the present invention. This embodiment is applicable to processing the input signal received from the human interface device 110.

Referring to FIGS. 1 to 3, in Step S305, the signal conversion module 230 is provided in the electronic apparatus 100, and the signal conversion module 230 registers into the operating system 210. This is because that the signal conversion module 230 can obtain the raw data of the input signal from the operating system 210 after registering into the operating system 210.

Next, in Step S310, the signal conversion module 230 obtains the raw data corresponding to the input signal from the operating system 210, when the electronic apparatus 100 receives the input signal from the human interface device 110. For example, if the human interface device 110 is a touch panel, the signal conversion module 230 obtains an original capacitance value on the touch panel from the operating system 210.

Then, in Step S315, the reference value is obtained from the driver 220 of the human interface device 110 through the signal conversion module 230. Afterwards, in Step S320, the signal conversion module 230 converts the raw data into the coordinate data according to the reference value. In detail, to convert the raw data of the input signal into coordinate data of screen pixel coordinates required by the application program 240, the signal conversion module 230 performs conversion according to the reference value. For example, the driver 220 obtains a boundary data of the human interface device 110, and obtains a resolution from the operating system 210, so as to calculate the reference value according to the boundary data and the resolution. That is, a scale of the size of the human interface device 110 and the resolution of display frames is calculated, and accordingly, the signal conversion module 230 can convert the raw data into coordinate data corresponding to the screen resolution according to the reference value. In addition, it may be configured such that a calibration program for the reference value is executed immediately when the driver 220 is started, and the reference value can be stored in a nonvolatile memory after the reference value is obtained, so as to avoid recalculating the reference value for each boot.

Finally, in Step S325, the coordinate data is sent to the application program 240 through the signal conversion module 230, so that the application program 240 uses the coordinate data to replace an original mouse move event.

Generally, if the human interface device 110 is a touch panel, the operating system 210 sends a mouse down signal, when the operating system 210 receives the input signal, that is, when a user touches the touch panel. Then, the operating system 210 executes the motion according to a coordinate position of the input signal till the user stops pressing the touch panel.

In this embodiment, the electronic apparatus 100 uses the signal conversion module 230 to convert the input signal into corresponding coordinate data. Accordingly, the application program 240 registers into the signal conversion module 230 when the electronic apparatus 100 receives the press signal through the application program 240. The signal conversion module 230, into which the external application program 240 registers, decodes the raw data corresponding to the input signal, that is, converts the raw data into the coordinate data according to the reference value, and sends the coordinate data to the application program 240. When the touch panel is continuously touched, the signal conversion module 230 continuously reads the raw data corresponding to the input signal, so as to convert the raw data into the coordinate data, and sends changes in the touch position or state to the application program 240. The application program 240 deregisters from the signal conversion module 230 when the press signal disappears, so that the signal conversion module 230 can be provided for use by other application programs.

Based on the above, the present invention provides a signal conversion module to directly process the input signal of the human interface device, so as to convert the input signal into the coordinate data through the signal conversion module, so that it does not need to process the input signal through the operating system, which can effectively improve the performance of the input signal sent from the human interface device, thereby effectively alleviating missing or delay of input signals.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for processing an input signal, applicable to an electric apparatus for processing an input signal received from a human interface device, the method comprising:
   providing a signal conversion module, and the signal conversion module registering into an operating system;
   obtaining a raw data corresponding to an input signal from the operating system through the signal conversion module, when the input signal is received from the human interface device;
   obtaining a boundary data of the human interface device through a driver;
   obtaining a resolution of a frame display from the operating system through the driver;
   calculating a reference value according to the boundary data and the resolution by the driver;
   converting the raw data into a coordinate data according to the reference value through the signal conversion module; and
   sending the coordinate data to an application program through the signal conversion module.

2. The method for processing an input signal according to claim 1, wherein before the step of converting the raw data into the coordinate data according to the reference value through the signal conversion module, the method further comprises:
   the application program registering into the signal conversion module, when the application program receives a press signal.

3. The method for processing an input signal according to claim 2, wherein after the step of sending the coordinate data to the application program through the signal conversion module, the method further comprises:
   the application program deregistering from the signal conversion module when the press signal disappears.

4. The method for processing an input signal according to claim 1, wherein the human interface device is a touch device.

5. An electronic apparatus, comprising:
   a human interface device, for generating an input signal; and
   a processor, coupled to the human interface device, for executing an operating system, and executing a signal conversion module under the operating system;
   wherein the signal conversion module registers into the operating system, the signal conversion module obtains a raw data corresponding to the input signal from the operating system when the input signal is received from the human interface device, and a driver of the human interface device obtains a boundary data of the human interface device as well as obtains a resolution of a display frame from the operating system for calculating the reference value according to the boundary data and the resolution so as to convert the raw data into a coordinate data according to the reference value, and the coordinate data is sent to an application program through the signal conversion module.

6. The electronic apparatus according to claim 5, wherein the application program registers into the signal conversion module when a press signal is received from the human interface device through the application program, and the application program deregisters from the signal conversion module when the press signal disappears.

7. The electronic apparatus according to claim 5, wherein the human interface device is a touch device.

8. The electronic apparatus according to claim 5, further comprising:
   a controller, respectively coupled to the human interface device and the processor, for converting the input signal from an analog signal into a digital signal.

* * * * *